United States Patent
Nagel et al.

(10) Patent No.: US 7,363,250 B2
(45) Date of Patent: Apr. 22, 2008

(54) MARKET CENTER BASED PURCHASING SYSTEM AND METHOD

(75) Inventors: Mark E Nagel, Bloomfield Hills, MI (US); Stephen R Luyckx, Troy, MI (US); Michael F Milad, Dallas, TX (US); Jonathan L Morgan, Milford, MI (US); Keith E Helfrich, Northville, MI (US)

(73) Assignee: Chrysler LLC, Auburn Hills, MI (US)

( * ) Notice: Subject to any disclaimer, the term of this patent is extended or adjusted under 35 U.S.C. 154(b) by 593 days.

(21) Appl. No.: 09/967,095

(22) Filed: Sep. 28, 2001

(65) Prior Publication Data

US 2003/0065573 A1    Apr. 3, 2003

(51) Int. Cl.
*G06Q 30/00* (2006.01)

(52) U.S. Cl. ..................................... 705/26

(58) Field of Classification Search .................. 705/26, 705/27, 28, 29, 8, 10; 709/203, 218
See application file for complete search history.

(56) References Cited

U.S. PATENT DOCUMENTS

| | | | |
|---|---|---|---|
| 4,799,156 A | 1/1989 | Shavit et al. | |
| 5,970,475 A | 10/1999 | Barnes et al. | |
| 6,272,472 B1* | 8/2001 | Danneels et al. | 705/27 |
| 6,324,522 B2* | 11/2001 | Peterson et al. | 705/28 |
| 6,963,854 B1* | 11/2005 | Boyd et al. | 705/37 |
| 7,165,041 B1* | 1/2007 | Guheen et al. | 705/26 |
| 7,315,826 B1* | 1/2008 | Guheen et al. | 705/7 |
| 2001/0047311 A1* | 11/2001 | Singh | 705/26 |
| 2001/0056395 A1* | 12/2001 | Khan | 705/37 |
| 2002/0120550 A1* | 8/2002 | Yang | 705/37 |
| 2002/0138400 A1* | 9/2002 | Kitchen et al. | 705/37 |

* cited by examiner

*Primary Examiner*—Ronald Laneau
(74) *Attorney, Agent, or Firm*—Ralph E. Smith

(57) ABSTRACT

A method and system is disclosed for procuring goods and services through a computer based system accessible by a plurality of entities having a common relationship. An arrangement is made with a plurality of suppliers to participate in offering goods and services to the entities through the computer based system. A price for the respective goods and services provided by at least subset of the suppliers at which the entities can purchase those goods and services is negotiated with those suppliers. The entities can, via the computer based system, obtain prices directly from the suppliers. The entities can place orders with any of the suppliers via the computer based system. Information on the transactions made via the computer based system is tracked and used to determine if more favorable prices are available for a good or service than the negotiated price.

8 Claims, 6 Drawing Sheets

MARKET CENTER BASED PURCHASING SYSTEM AND METHOD

FIELD OF THE INVENTION

The present invention relates generally to a system and method for procurement of goods and services. More specifically, the present invention relates to a system and method for an Electronic Market Center for procuring goods and services by entities that have a common relationship.

BACKGROUND OF THE INVENTION

Certain organizations such as franchises pose special problems and opportunities in the procurement of goods and services that differ from other organizations. A franchise, for example an Original Equipment Manufacturer (OEM) as a franchiser may have several franchisee dealerships numbering in the thousands. Each of these dealerships together with the OEM have requirements for the purchase of goods and services common to each other. However, in many instances the OEM and its dealerships do not share their purchasing knowledge, resources or aggregate their purchases of goods and services to take advantage of the more favorable terms that may be available in the marketplace for large orders, such as volume discounts. A dealership will usually rely upon an individual within its organization to perform the purchasing function. This burdens the assigned individual with the time consuming and difficult task of choosing among many suppliers available for the many different goods and services that the dealership purchases and then negotiating price and other terms for the purchase of those goods and services.

At the same time the much larger OEM carries on its own purchasing function. An OEM may have a purchasing department with several individuals dedicated to the purchasing function. This allows the OEM's purchasing department to develop more extensive knowledge and expertise in purchasing the goods and services that the OEM purchases than smaller organizations are typically able to develop. This knowledge and expertise may allow the OEM to obtain favorable terms for the purchase of goods and services. This can be particularly true for the purchase of commodities where the OEM's purchasing department's knowledge, expertise and resources allows it to seek out suppliers that will sell the commodities on the best terms.

There are known electronic purchasing systems, including "Electronic Commerce" purchasing systems. For example, U.S. Pat. No. 5,970,475 discloses an Electronic Procurement System and Method for Trading Partners. This system is directed to a corporate environment where individual employees are allowed limited access to the purchasing system to procure products or services. A supplier catalog server is accessed by the corporate employees in order to select and enter into transactions. This supplier catalog server is said to interface with the suppliers legacy systems. The primary objective of this patent is to provide different levels of authorization so that different users within the same organization can be limited in their access to different products or services and limited in amounts available for spending. However, this system and other "Electronic Commerce" systems, do not offer the benefits and functionality of a "Market Center" system and method in accordance with the present invention.

SUMMARY OF THE INVENTION

A purchasing method and system in accordance with the invention provides an electronic purchasing system for access by distinct entities that have a common relationship to use to purchase goods and services from suppliers of goods and services. Purchasing terms, such as price, based upon the aggregate buying requirements of the entities for specific goods and services are negotiated and the entities can purchase such goods and/or services at the negotiated terms via the purchasing system. The purchasing system also allows an individual entity to go to the suppliers and see if a better price or other terms are available for a good or service and if so, to purchase that good or service from the supplier that offers the better price or other terms. Information concerning more favorable prices or other terms available in the marketplace than the negotiated price or other terms is used to validate the negotiated price or other terms, and renegotiate them as appropriate. Also, this information is accessible to the entities who have access to the purchasing system so that they can, if they so choose, take advantage of such a more favorable price or other term available in the marketplace. In an embodiment, the electronic purchasing system is an Internet World Wide Web site, referred as the "Market Center" web site, that the entities can access via the Internet and that is hyperlinked to web sites of suppliers that are configured to interact with the Market Center web site.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 3b is a flowchart showing a continuation of the purchasing process as detailed in FIG. 3a;

DETAILED DESCRIPTION OF THE PREFERRED EMBODIMENTS

The following description of the preferred embodiment(s) is merely exemplary in nature and is in no way intended to limit the invention, its application, or uses.

Figure 1:
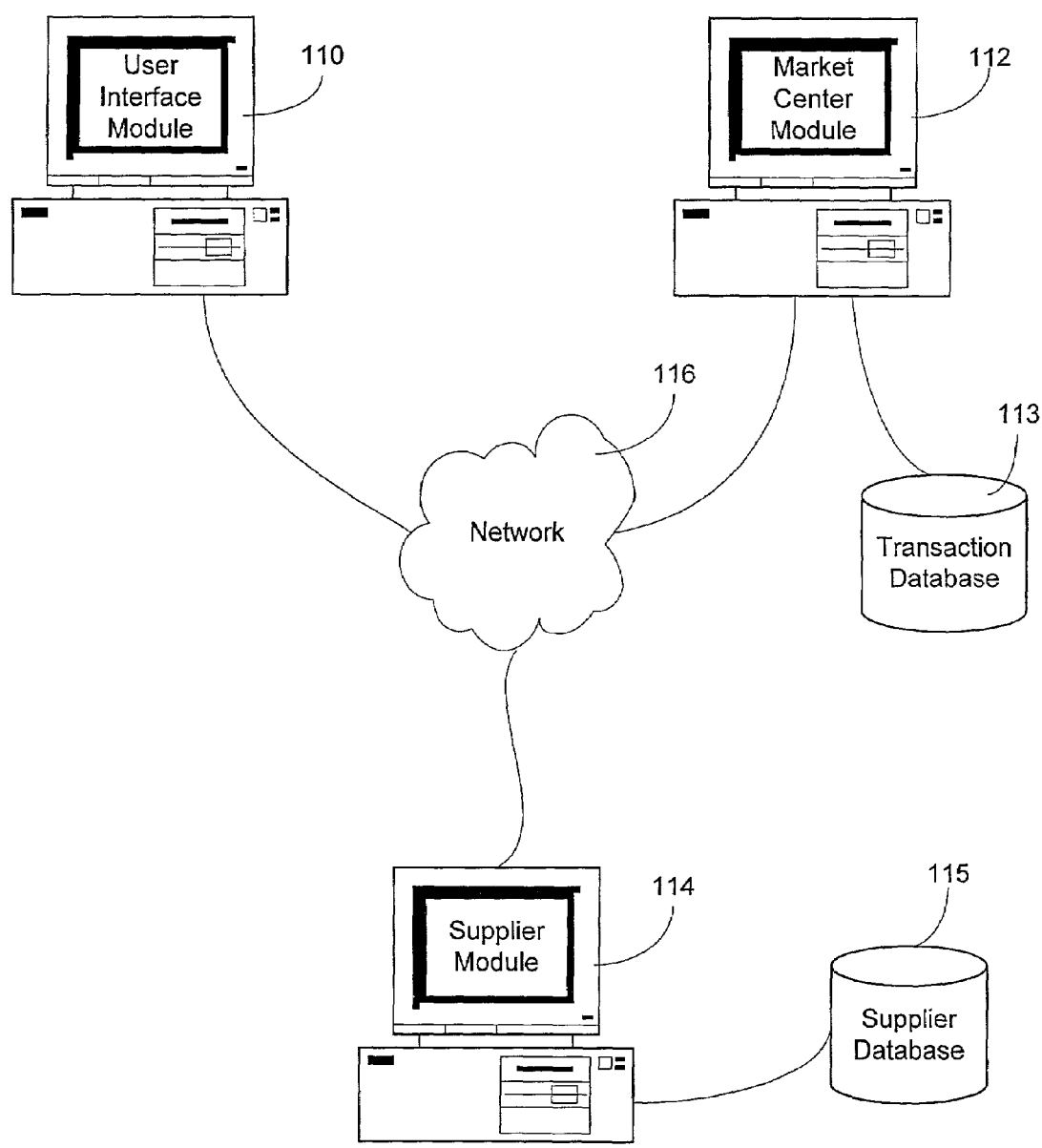
FIG. 1 is a block diagram showing the components of the Market Center based purchasing system of the present invention.

FIG. 1 illustrates the primary modules of the Market Center based purchasing system including a user interface module 110, a Market Center module 112 and a supplier module 114. Each of these three primary modules are connected and may interact through a network 116. The user interface module 110 is a computer or workstation with a browser application present in its memory so that it may connect to a network 116, such as the Internet. The supplier module 114 includes a computer with resident in its memory, a supplier application for displaying goods and/or services offered by a particular supplier. The supplier module 114 is capable of displaying the supplier's goods and/or services with associated pricing in a form that is accessible and readable by the user interface module 110. In one embodiment, the supplier module 114 will display goods and/or services information and associated prices as web pages readable by the browser application that is incorporated in the user interface module 110. The supplier module 114 may also include a supplier database 115 for maintaining the supplier's information about its goods and/or services with associated pricing. In the Market Center based purchasing system a particular supplier will provide and maintain its own supplier module 114 and supplier database 115.

The Market Center module 112 includes a computer with memory, storage and a Market Center application for providing information about various suppliers and their associated goods and/or services available through the Market Center. The Market Center module 112 may also include a transaction database 113 for storing information about transactions entered into through the Market Center. The Market Center module 112 application will display the information about the various suppliers in a form readable by the user interface module 110 and displayable on a monitor. In an embodiment, the Market Center module 112 will display the information about suppliers and their associated products/services as web pages viewable through a browser application. The network 116 connecting the user interface module 110, the Market Center module 112, and the supplier module 114, will typically be the Internet. The network 116 may also include local area networks, intranets and internets. For example, the network 116 could be a company wide intranet connected to the Internet.

Figure 2:
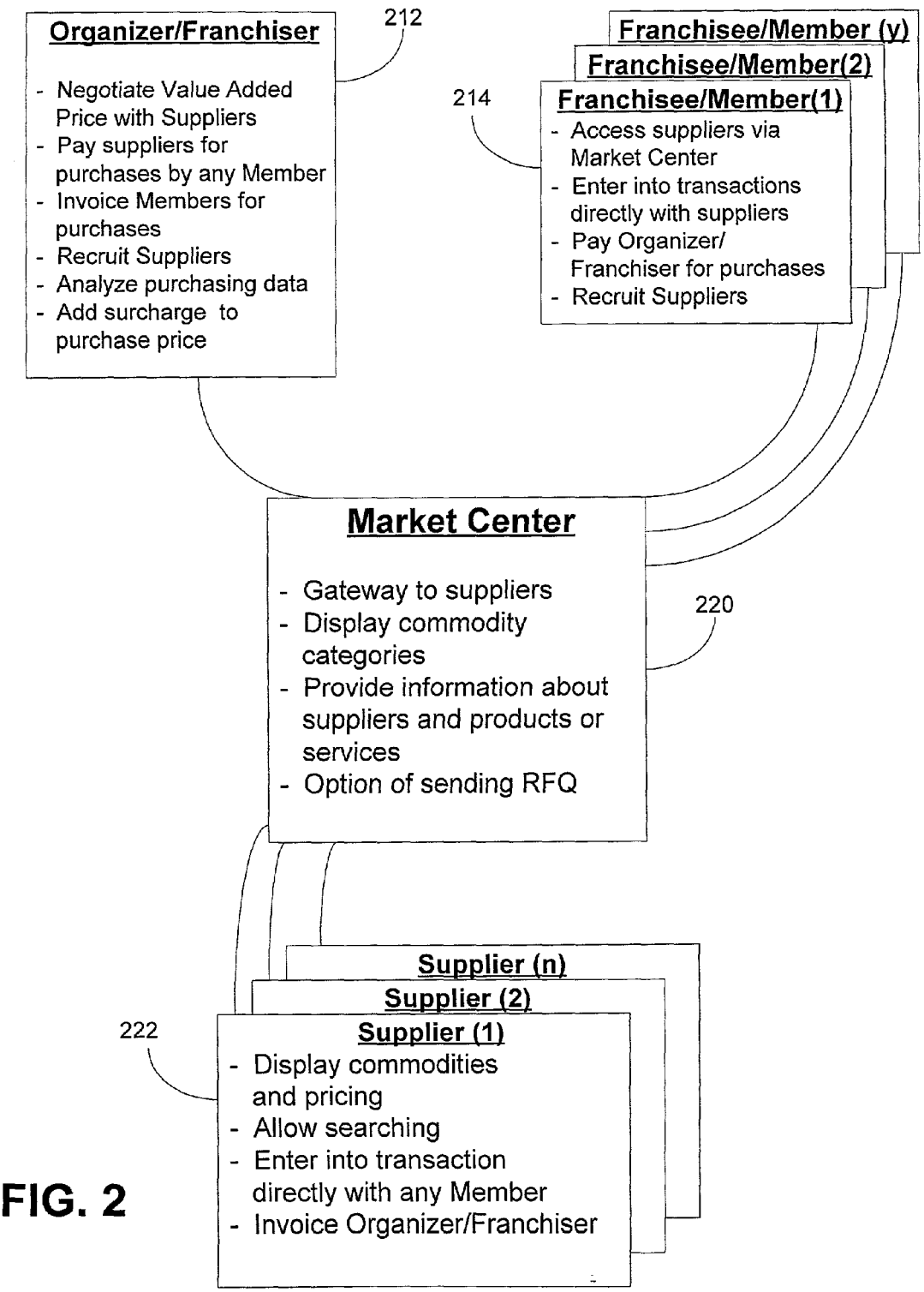
FIG. 2 is a diagram illustrating the functions assigned to the various components of the Market Center purchasing system.

In FIG. 2, the Market Center based purchasing system has an organizer/franchiser 212, multiple franchisee/members 214, and multiple suppliers 222 all linked to a centralized Market Center 220. The organizer/franchiser 212 is responsible for performing the centralized purchasing function for the Market Center 220. This includes negotiating with various suppliers 222, a value added price, such as a discounted price available only to franchisee/members 214 and the organizer/franchiser 212. A value added price can be achieved by offering the suppliers 222 an opportunity to promote their goods/services on the Market Center 220 and offer their goods/services to a group of interested buyers, including the franchisee/members 214.

The organizer/franchiser 212 is also responsible for paying suppliers 222 for any purchasers made by any franchisee/member 214. This provides value to the supplier 222 in that the supplier 222 need issue only one invoice for purchases made by the various franchisee/members 214 in a given time period, such as month, as opposed to issuing separate invoices to each entity that made a purchase. This function of the Market Center 220 based purchasing system also provides the suppliers 222 the consistency and reliability of payment by the large organizer/franchiser 212 while providing the franchisee/members 214 with consolidated invoices for purchases made through the Market Center 220.

The organizer/franchiser 212 may be compensated for providing the consolidated billing and payment services to the suppliers 222 and to the franchisee/members 214 such as by assessing a surcharge on the purchases made by the franchisee/member 214. The organizer/franchiser 212 will pay the supplier invoice and in turn invoice the franchisee/member 214 for any purchases made through the Market Center 220 purchasing system.

The organizer/franchiser 212 together with any individual franchisee/member 214 may recruit suppliers to offer their goods/services through the Market Center 220. Suppliers 222 may be recruited based on their price and/or terms and/or quality of goods/services offered. The Market Center 220 based purchasing system allows any franchisee/member 214 to seek out a better deal with a supplier 222 than available through the Market Center 220. The franchisee/member 214 can induce a supplier 222 into participating in the Market Center 220, by offering the supplier 222 the opportunity to offer their goods/services to a limited group of franchisee/members 214 and the organizer/franchiser 212. Suppliers 222 may also be recruited to compete in offering a product or services that better fits the needs of the organizer/franchiser 212, and franchisee/members 214, or a better price than offered by other available suppliers.

The organizer/franchiser 212 may also analyze purchasing data received as a result of transactions entered into through the Market Center 220 including transactions at the value added prices and transactions at other prices. The purchasing data will be analyzed to determine areas where substantial purchases are made by the franchisee/members 214 and where the franchisee/members 214 have achieved better pricing than offered through the Market Center 220. Access to this data allows the organizer/franchiser 212, to determine which suppliers 222 are favored by the franchisee/members 214 and which suppliers 222 are offering the best price for the available goods/services. This information can be used to negotiate (or renegotiate) with a particular supplier 222 the value added price offered to the franchisee/members 214.

The franchisee/members 214 access suppliers 222 via the Market Center 220. By connecting to the Market Center 220, each franchisee/member 214 is given the option of reviewing detailed information about available goods/services and suppliers 222. Through the Market Center 220, a franchisee/member 214 may access the web site of a supplier 222. In an embodiment, the web site of the supplier 222 will be specific to the Market Center 220 and will display pricing only available to the Market Center 220 participants. Once the franchisee/member 214 accesses the supplier 222 web site, the franchisee/member 214 can view the value added price entered into between the supplier 222 and the organizer/franchiser 212. Through the Market Center 220 transactions are entered into between a franchisee/member 214 or organizer/franchiser 212 and the supplier 222. Information about the transaction is passed through the Market Center 220 to the organizer/franchiser 212. The organizer/franchiser 212 then pays the supplier 222 for the purchases made by the franchisee/member 214.

The suppliers 222 display their goods/services and associated pricing at a supplier web site accessible by participants in the Market Center 220 based purchasing system. Through the supplier 222 web site a supplier 222 may allow any franchisee/member 214 or organizer/franchiser 212 to search through available goods/services including goods/services that are not offered with a value added price. Typically, a supplier 222 through its web site will offer its goods/services and list the value added price as agreed upon with the organizer/franchiser 212. This price changes as the terms of an agreement between the organizer/franchiser 212 and supplier 222 changes over time. Through the supplier 222 web site the supplier 222 enters into a transaction directly with any franchisee/member 214 including the organizer/franchiser 212. This allows the franchisee/member 214 to establish independently of the organizer/franchiser 212, any terms for delivery and receipt of the goods/services.

Figure 3A:
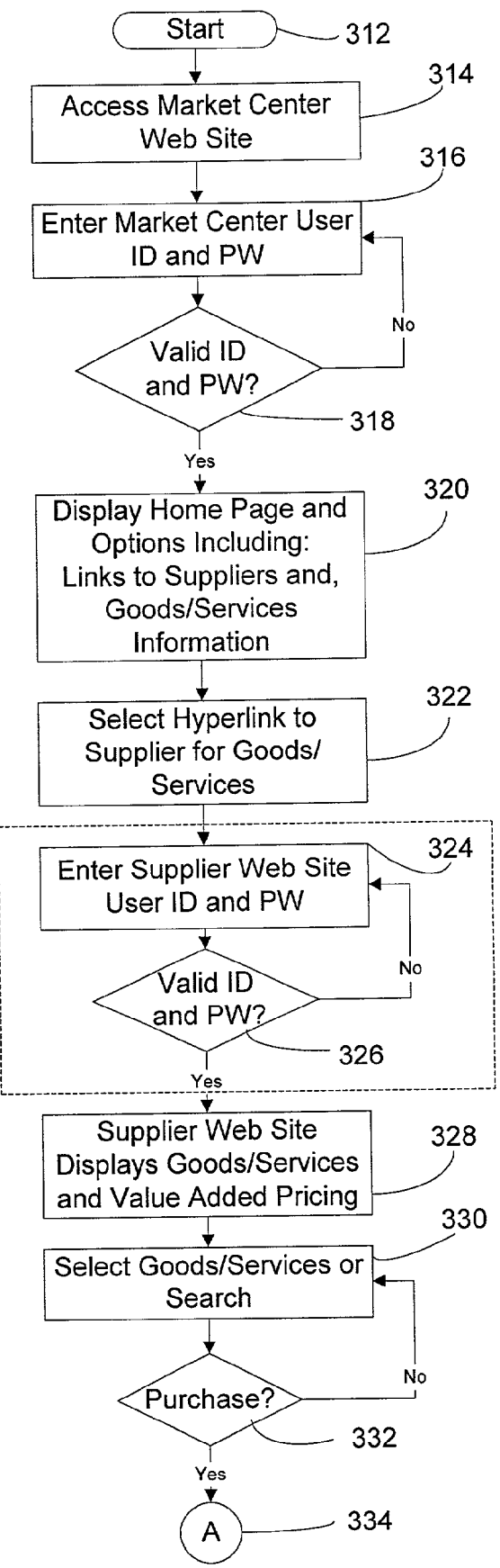
FIG. 3a is a flowchart showing a preferred embodiment of the Market Center based purchasing system and purchasing process.

In FIG. 3a, a purchaser including a franchisee/member 214 or organizer/franchiser 212 starts the purchasing process at step 312 and accesses the Market Center 220 web site in step 314. In step 316, the Market Center 220 application will request the purchaser to enter a valid user I.D. and password. If the I.D. and password are validated in step 318, the purchaser is taken to the Market Center 220 web page in step 320 where options are displayed including links to suppliers 222 and information about goods/services offered by various suppliers 222. A purchaser may review information specific to a supplier 222 and/or goods/services before selecting a specific supplier 222 to connect to the supplier's web site for entering into a transaction and/or reviewing more detailed information about the goods/services offered by that supplier 222. After reviewing the Market Center 220 web page in 320 and the information contained therein, the purchaser may in step 322 select a hyperlink to a specific supplier 222. The hyperlink will connect the purchaser directly to a web site provided by the supplier 222.

In steps 324 and 326, the supplier web site requires an input of a user I.D. and password. This user I.D. and password may be different from the user I.D. and password entered into in steps 316 and 318 in order to access the Market Center 220 web site. In a preferred embodiment, the Market Center 220 would be linked to the web sites of suppliers 222 so as to eliminate the need for entering user I.D.s and passwords specific to the web sites of suppliers 222 once a purchaser has successfully accessed the Market Center 220.

Next, in step 328, the supplier 222 web site displays the goods/services and associated value added pricing to the purchaser. If a value added pricing agreement does not exist between the supplier 222 and the organizer/franchiser 212, then non-value added pricing will be displayed. The supplier 222 web site will also offer an ability to search for available goods/services and provide additional information about the supplier 222 and the specific goods/services offered. Further, the purchaser may take advantage of other features and capabilities offered by the supplier 222 web site including any functionality for providing information about the goods/services offered.

In step 330, the purchaser may select among the available goods/services or search for goods/services if that function is offered by the supplier 222 web site. In step 332, the purchaser makes a decision to purchase any of the goods/services offered by the supplier 222.

Figure 3B:
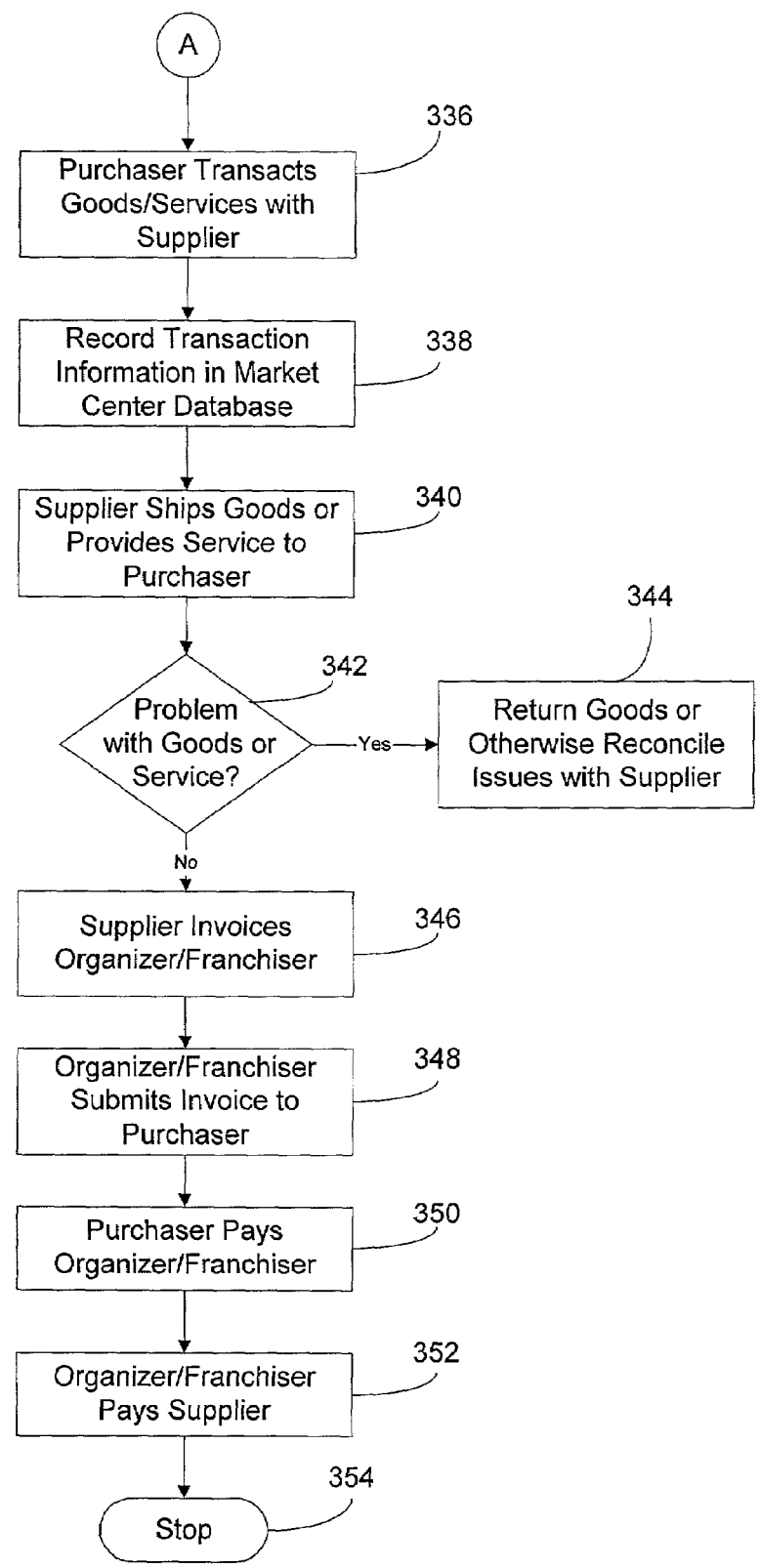

Referring now to FIG. 3b in step 336, the purchaser enters into a transaction for the goods/services offered by the specific supplier 222 through the supplier's web site. By entering into a transaction the purchaser agrees to pay and the supplier 222 agrees to accept the price for the goods/services offered by the supplier 222. In step 338, the information regarding the transaction entered into is recorded in a transaction database 113 connected to the Market Center module 112.

Figure 4:
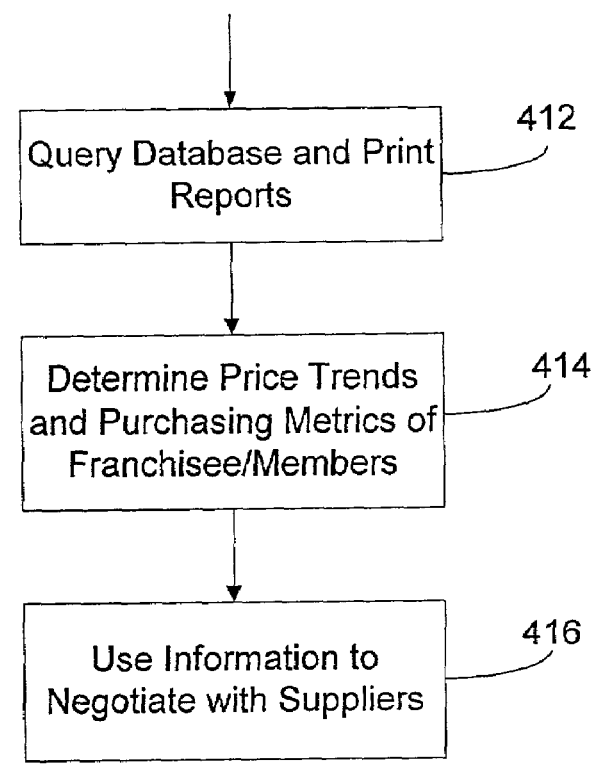
FIG. 4 is a flowchart illustrating the process of evaluating the purchasing patterns of Franchisee/Members.

Referring briefly to FIG. 4, the organizer/franchiser 212 can advantageously use the information stored in the transaction database 113. In step 412, the organizer/franchiser can query the transaction database 113 and print reports based on the transactional information entered into the transaction database 113. In step 414, the franchiser/organizer 212 uses the data in the transaction database 113 to determine price trends and purchasing metrics of franchisee/members 214 and their own purchasing habits. In step 416, the information provided by the transaction database 113 is used to determine if a more favorable price can be negotiated with the specific supplier for particular goods/services offered.

Returning to FIG. 3b in step 340, the supplier 222 will ship the goods or provide the service directly to the purchaser. This allows the purchaser to dictate the terms and location for delivery and to remove this process from the organizer/franchiser 212. If there is a problem with the goods or services as checked in step 342, then the goods are returned or issues are otherwise resolved with the supplier 222 in step 344. This again advantageously removes the organizer/franchisee 212 from resolving issues that may arise between the purchaser and supplier 222 such as the possibility of damaged goods.

Assuming the goods and/or services meet the specifications of the purchaser, then in step 346 the supplier 222 will invoice the organizer/franchiser 212 for the goods/services purchased by the purchaser. Next, in step 348, the organizer/franchiser 212 submits an invoice to the purchaser for the goods/services purchased from the supplier 222. Typically, the invoice will be submitted in a consolidated format allowing the purchaser to review all transactions entered into through the Market Center 220. The purchaser pays against the invoice directly to the organizer/franchiser 212 in step 350. Finally, in step 352, the organizer/franchiser 212 pays the supplier 222 for the goods/services purchased by the purchaser. The process ends in step 354. Alternatively, the organizer/franchiser may pay suppliers, 222 prior to receiving payment from the purchaser depending on the payment terms in the agreement negotiated with the supplier 222. Also, if the purchaser maintains an account with the organizer/franchiser 212, such as accounts that franchisees often have with their franchises, the organizer/franchiser 212 can debit the purchaser's account for purchased goods/services and including a surcharge.

Figure 5:
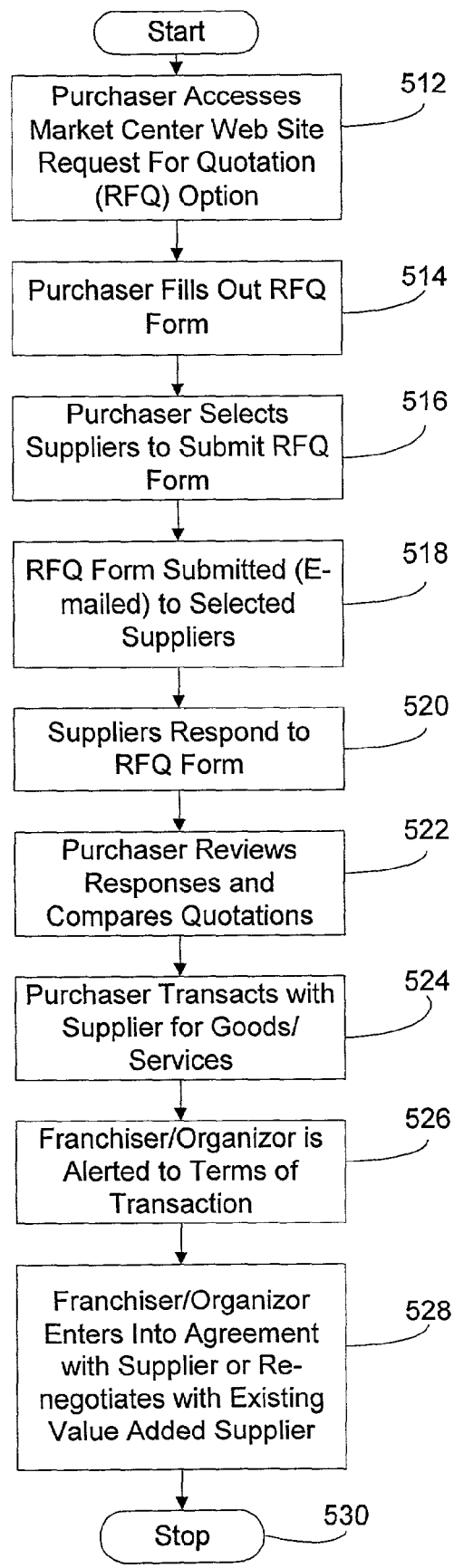
FIG. 5 is a flowchart illustrating the request for quotation option and process of the Market Center based purchasing system.

Referring to FIG. 5, the request for quotation process is described. The request for quotation (RFQ) process allows the purchaser to submit a request to one or more suppliers 222 for a specific good/service offered by the supplier 222. The purchaser may attempt to improve upon the price offered by the supplier 222 for a particular good/service. The purchaser may also attempt to improve upon the value added price agreed upon between the supplier 222 and the organizer/franchiser 212. In step 512, the purchaser accesses the Market Center 220 web site RFQ option. In step 514, the purchaser fills out the RFQ form or otherwise complies with the supplier's 222 requirements for submission of the request for quotation. Then, in step 516, the purchaser selects the suppliers 222 to receive the RFQ form. The RFQ form will be submitted directly to the supplier 222 or submitted via E-mail as identified in step 518. Alternatively, the RFQ information will be directly communicated to the supplier by telephone or facsimile.

In step 520, the supplier 222 receives and then responds to the RFQ. The supplier's 222 options in response are to provide a quotation at a price or to deny the request for a quotation. The response of the supplier 222 may be submitted as a return E-mail message to the Market Center 220 web site. In step 522, the purchaser reviews the responses to the request for quotation. If the terms are acceptable to the purchaser, then in step 524, the purchaser transacts with the supplier 222 for the goods/services requested. In order to improve upon pricing for goods/services for all franchisee/members 214 the information provided in the request for quotation and response is shared with the franchise/organizer 212 in step 526. As discussed above this allows the franchiser/organizer 212 to monitor the transactions entered into via the Market Center 220 and determine whether the value added price is the best price available. The organizer/franchiser 212 can then determine whether it should negotiate (or renegotiate) with the supplier 222 and achieve an improved price available to all participants in the Market Center 220. This is represented in step 528 where the franchise/organizer 212 enters into an agreement with the supplier 222 or renegotiates with an existing value added supplier 222 for a new price for the particular good/service transacted through the request for quotation process. This process concludes in step 530.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of procuring goods and services through a computer based market center system having a website accessible by a plurality of entities via the Internet, the method comprising:

arranging with a plurality of suppliers, each having an Internet website, to participate in offering goods and services to the entities via the website of the market center system;

negotiating with at least a subset of said suppliers prices for their respective goods and services at which said entities can purchase the respective goods and services;

allowing said entities to place orders with any of the at least a subset of suppliers for respective goods and services via purchaser websites and the market center website; and allowing said entities an option of obtaining via purchaser websites and the market center website a price quotation from any of the at least a subset of suppliers;

collecting information on said purchases made by said entities via said computer based market center system and on quotes received directly from said suppliers by said entities and analyzing said information at said computer based market center system; and determining if any of said quotes were for goods or services having a previously negotiated price and if so, whether said quotes for that good or service were at prices more favorable than said previously negotiated prices.

2. The method of claim 1, further including renegotiating said negotiated price for one of said goods and services when results of analyzing said information indicate that a more favorable price than the negotiated price for that good or service is being offered.

3. The method of claim 1 wherein said plurality of entities having a common predetermined relationship comprise an original equipment manufacturer and its dealerships.

4. The method of claim 1 wherein said plurality of entities having a common predetermined relationship comprise a franchise.

5. The method of claim 1 wherein said plurality of entities having a common predetermined relationship comprise individuals that are members of a club.

6. The method of claim 1 wherein information concerning purchases made by and quotes obtained by said entities via said computer based market center system are stored in a database.

7. The method of claim 1 further including a host organization paying said suppliers for purchases made from said suppliers via said computer based market center system by said entities and said host organization billing said entities for said purchases.

8. The method of claim 7, further including the step of said host organization operating said computer based market center system.

* * * * *